(12) United States Patent
Maanoja et al.

(10) Patent No.: US 7,945,775 B2
(45) Date of Patent: May 17, 2011

(54) METHOD AND EQUIPMENT FOR CONTROLLING INFORMATION PROVIDED TO A USER IN A NETWORK

(75) Inventors: Markus Maanoja, Helsinki (FI); Petri Kokkonen, Espoo (FI); Jan Käll, Espoo (FI); Tomi Varonen, Helsinki (FI); Matti Saarenpää, Tampere (FI); Mårten Lampinen, Kerava (FI)

(73) Assignee: Nokia Corporation, Espoo (FI)

( * ) Notice: Subject to any disclaimer, the term of this patent is extended or adjusted under 35 U.S.C. 154(b) by 983 days.

(21) Appl. No.: 10/494,210

(22) PCT Filed: Oct. 29, 2001

(86) PCT No.: PCT/IB01/02732
§ 371 (c)(1),
(2), (4) Date: May 20, 2004

(87) PCT Pub. No.: WO03/038670
PCT Pub. Date: May 8, 2003

(65) Prior Publication Data
US 2004/0260944 A1 Dec. 23, 2004

(51) Int. Cl.
*H04L 29/06* (2006.01)
(52) U.S. Cl. .................................. 713/154; 713/150
(58) Field of Classification Search .............. 380/30;
726/30, 22, 23, 24, 25, 26, 27, 28, 29
See application file for complete search history.

(56) References Cited

U.S. PATENT DOCUMENTS

| 5,245,656 A * | 9/1993 | Loeb et al. ............ 713/154 |
| 6,735,441 B1 * | 5/2004 | Turgeon et al. ........ 455/433 |
| 6,771,663 B1 * | 8/2004 | Jha ..................... 370/473 |
| 7,441,016 B2 * | 10/2008 | Gailey et al. .......... 709/219 |
| 2004/0260944 A1 * | 12/2004 | Maanoja et al. ........ 713/201 |

FOREIGN PATENT DOCUMENTS

| JP | 11-55726 | 2/1999 |
| JP | 11-136773 | 5/1999 |
| JP | 2001-268548 | 9/2001 |
| WO | WO 01/44992 A1 | 6/2001 |
| WO | WO 01/76120 A2 | 10/2001 |
| WO | WO 03/038670 A1 | 5/2003 |

* cited by examiner

*Primary Examiner* — Pramila Parthasarathy
(74) *Attorney, Agent, or Firm* — Ditthavong Mori & Steiner, P.C.

(57) ABSTRACT

The invention relates to a method for controlling information provided to a user in a telecommunications network from at least one information provider. The network has identifying information defining the at least one type of information which can be provided to the user. The method comprises the steps of determining the type of information which an information provider proposed to provide to the user; and uses the identifying information and the determined type of information to control if the proposed information can be provided to the user.

36 Claims, 2 Drawing Sheets

METHOD AND EQUIPMENT FOR CONTROLLING INFORMATION PROVIDED TO A USER IN A NETWORK

FIELD OF THE INVENTION

The present invention relates to a method, an apparatus, and a computer storage medium carrying one or more sequences of one or more instructions for controlling information provided to a user in a network. In particular, but not exclusively, the present invention relates to the control of information provided from a service provider to a mobile station.

BACKGROUND OF THE INVENTION

Communication systems providing mobility for the users thereof are known. A well known example of the mobile communication systems is the public land line mobile network (PLMN), a cellular communication network being an example of the PLMN. Another example is a mobile communication system that is based, at least partially, on use of communication satellites.

The mobile network apparatus and/or user equipment such as a mobile station can be employed for provision of information regarding the geographical location of the user equipment and thus the user thereof. A mobile user equipment and thus the user thereof can be positioned by various different techniques. For example, substantially accurate geographical location information that associates with a user equipment can be obtained based on the known satellite based GPS (Global Positioning System). More accurate location information can be obtained through a differential GPS.

Another possibility is to use a location service that associates with a cellular telecommunications system for the provision of the location information. In this approach the cells or similar geographically limited radio access entities and associated controllers of the communication system are utilised in production of at least a rough location information estimate concerning the current location of the mobile user equipment. To improve the accuracy of the location information the communication system may be provided with specific location measurement units that provide more accurate data concerning the location of a user equipment within the service area of the cellular system. It is also possible to conclude geographical location when the mobile user equipment is located within the coverage area of a visited or "foreign" network. The visited network may be made capable of transmitting the location of the mobile user equipment back to the home network, e.g. to support services that are based on location information or for the purposes of routing and charging.

The location data may be processed in a specific location service entity that is implemented either within the cellular system or connected thereto. The location data may also be processed in the user equipment that is provided with appropriate processing capacity. The location service entity provided by the communication system may serve different clients via an appropriate interface.

The location information may be used for various purposes, such as for location of a mobile telephone that has made an emergency call, for locating vehicles or given mobile subscribers and so on. In general, a client such as a user equipment or another entity wishing to receive location information regarding a user equipment may send a request for such information to the location service provision entity. The location service provisioning entity will then process the request, obtain the required data and generate an appropriate response.

An example of the provision of the location information by a PLMN is described in more detail $3^{rd}$ Generation Partnership Project (3GPP) technical specifications, see e.g. 3GPP TS 23.271 version 4.2.0, titled "Functional stage 2 description of LCS", June 2001.

According to the 3GPP specification a location service (LCS) server entity referred to as a Gateway Mobile Location Center (GMLC) is provided for managing the location services. The GMLC is for gathering and storing various data that may be used in provision of location information for location service clients (LCS clients). The LCS Client may make use of that location information for various services/applications. A possible application comprises a LCS client arranged to provide location information in response to a request for non-call related location information. Such a request for location information is referred to in the 3GPP specifications as a non-call related MT-LR (Mobile Terminated Location Request).

Use of a so called "Authorized UE List" has been proposed. This list contains Mobile Subscriber ISDN (MSISDN) (ISDN—Integrated Services Digital Network) numbers or groups of MSISDNs which are authorised to initiate a location information provision procedure. That is, MSISDNs or groups of MSISDN are listed for which the LCS Client may issue a non-call related MT-LR. Separate lists of MSISDNs may be associated with each distinct external or non-call related client identity. Location information may be provided by the LCS server to the LCS client in response to a request for location information from a user with a MSISDN number that appears in said list.

The LCS Client who is external to the PLMN system may only be enabled to validly issue location information requests for those MSISDNs which are found on the "Authorized UE List". That is, the LCS clients request may only be responded for subscribers who subscribe to the location services provided by the PLMN, as their MSISDNs would not otherwise appear on the list.

Request from the LCS Client are authenticated based on a combination of a Client ID and password stored in a LCS Client profile at the LSC server (e.g. the GMLC) and authorized based on the "Authorized UE List". That is, the LCS client is authorised to receive location information from the GMLC entity if the requesting user equipment (UE) is found from the list.

LCS clients are typically Application Service Providers (ASP) who are not a part of the PLMN system. Therefore the operator of the PLMN may not be able to control the behaviour of the LCS client.

Another problem is that the ASPs may be authorised to send information to a subscriber. ASPs can provide a wide range of information. The subscriber, once he has authorised a particular ASP is not able to control what sort of information is received. This can lead for example to children receiving adult type material. Clearly this is disadvantageous.

SUMMARY OF THE INVENTION

Embodiments of the present invention aim to address one or several of the above problems.

According to a first aspect of the present invention there is provided a method for controlling information provided to a user in a telecommunications network from at least one information provider, said network having identifying information defining the at least one type of information which can be provided to said user, said method comprising the steps of determining the type of information which an information provider proposes to provide to said user; and using said identifying information and the determined type of information to control if said proposed information can be provided to said user.

According to a second aspect of the present invention there is provided a telecommunications network connected to at least one information provider and having at least one user, said network comprising means for storing identifying information defining at least one type of information which can be provided to said user, means for determining the type of information which an information provider proposes to provide to said user, and means for using said identifying information and the determined type of information to control if said proposed information is provided to said user.

According to a third aspect of the present invention there is provided an entity for use in a telecommunications network, said entity comprising means for receiving identifying information for a user defining at least one type of information which can be provided to that user from an information provider, means for determining the type of information an information provider proposes to provide to said user; and means for using said identifying information and the determined type of information to control if said proposed information can be provided to said user.

According to a fourth aspect of the present invention there is provided a method for controlling a service provided to a user in a telecommunications network from at least one information provider, said network having identifying information defining the at least one type of service which can be provided to said user, said method comprising the steps of determining the type of service which an information provider proposes to provide to said user, and using said determined type of service and said identifying information to control if said proposed service can be provided to said user.

BRIEF DESCRIPTION OF DRAWINGS

For better understanding of the present invention, and as to how the same may be carried into effect, reference will now be made by way of example to the accompanying drawings in which.

DESCRIPTION OF PREFERRED
EMBODIMENTS OF THE INVENTION

Figure 1:
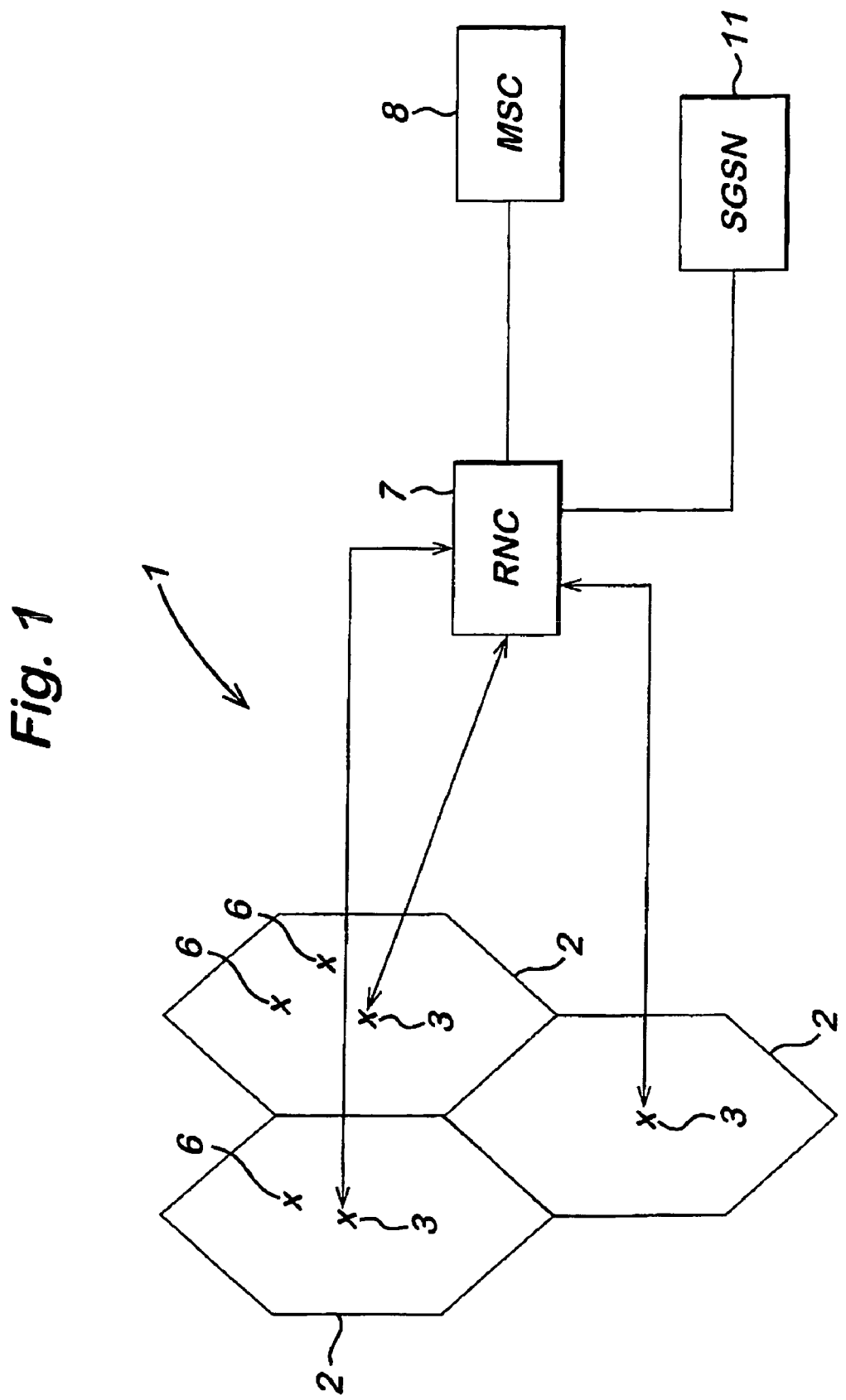
FIG. 1 shows a system in which embodiments of the present invention can be used.

Reference is made to FIG. 1 which is a simplified presentation of a cellular system providing location services. It should be appreciated that even though the exemplifying telecommunications network shown and described in more detail uses the terminology of the third generation (3G) UMTS (Universal Mobile Telecommunications System) public land mobile network (PLMN), the proposed solution can be used in any system providing mobile communications for users and some kind of location information service. Examples of other telecommunications systems include, without limiting to these, standards such as the GSM (Global System for Mobile communications) or various GSM based systems (such as GPRS: General Packet Radio Service), AMPS (American Mobile Phone System) or DAMPS (Digital AMPS), IMT 2000 (International Mobile Telecommunications system 2000), i-phone and so on.

More particularly, FIG. 1 shows an arrangement in which base stations 3 (only three shown for clarity) of the cellular system 1 provide radio coverage areas i.e. cells 2. Each radio coverage area 2 is typically served by a base station. It should be appreciated that one cell may include more than one base station site. A base station apparatus or site may also provide more than one cell. The shape and size of the cells 2 depend on the implementation and may be different from the illustrated shapes. The shape and size of the cells may also vary from cell to cell. It should be appreciated that in some systems the base station may be referred to as Node B.

Two user equipment such as mobile stations (MS) 6 are also shown. It shall be appreciated that typically a number of user equipment will be in communication with each base station. Each base station is arranged to transmit signals to and receive signals from the mobile user equipment (UE) 6 via a wireless interface. Likewise, the user equipment 6 are able to transmit signals to and receive signals from the base stations.

Each of the base stations is connected to an access network controller such as a radio network controller (RNC) 7 of a UMTS terrestrial radio access network (UTRAN) or a base station controller of a GSM type system. The radio network controller may be connected to appropriate core network entities of the cellular system, such as a MSC (mobile switching centre) 8 and/or SGSN (serving general packet radio service support node) 11, via a suitable interface arrangement.

The location of a mobile user equipment may vary in time as the user equipment is free to move within the coverage area of a base station and also from a coverage area to another coverage area. The modern communication systems are capable of providing information regarding the geographical location of a user equipment within the coverage area thereof. The geographical location may be defined on the basis of the position of the mobile station relative to the base station(s) of the mobile telecommunications network.

The geographical location of the user equipment may be defined, for example, in X and Y co-ordinates or in latitudes and longitudes. A possibility is to use the relation between defined radiuses and angles, e.g. based on the spherical coordinate system or alike. It is also possible to define the location of the base stations and/or mobile stations in vertical directions. For example, Z co-ordinate may be used when providing the location information in the vertical direction. The vertical location may be needed e.g. in mountainous environments or in cities with tall buildings.

Figure 2:
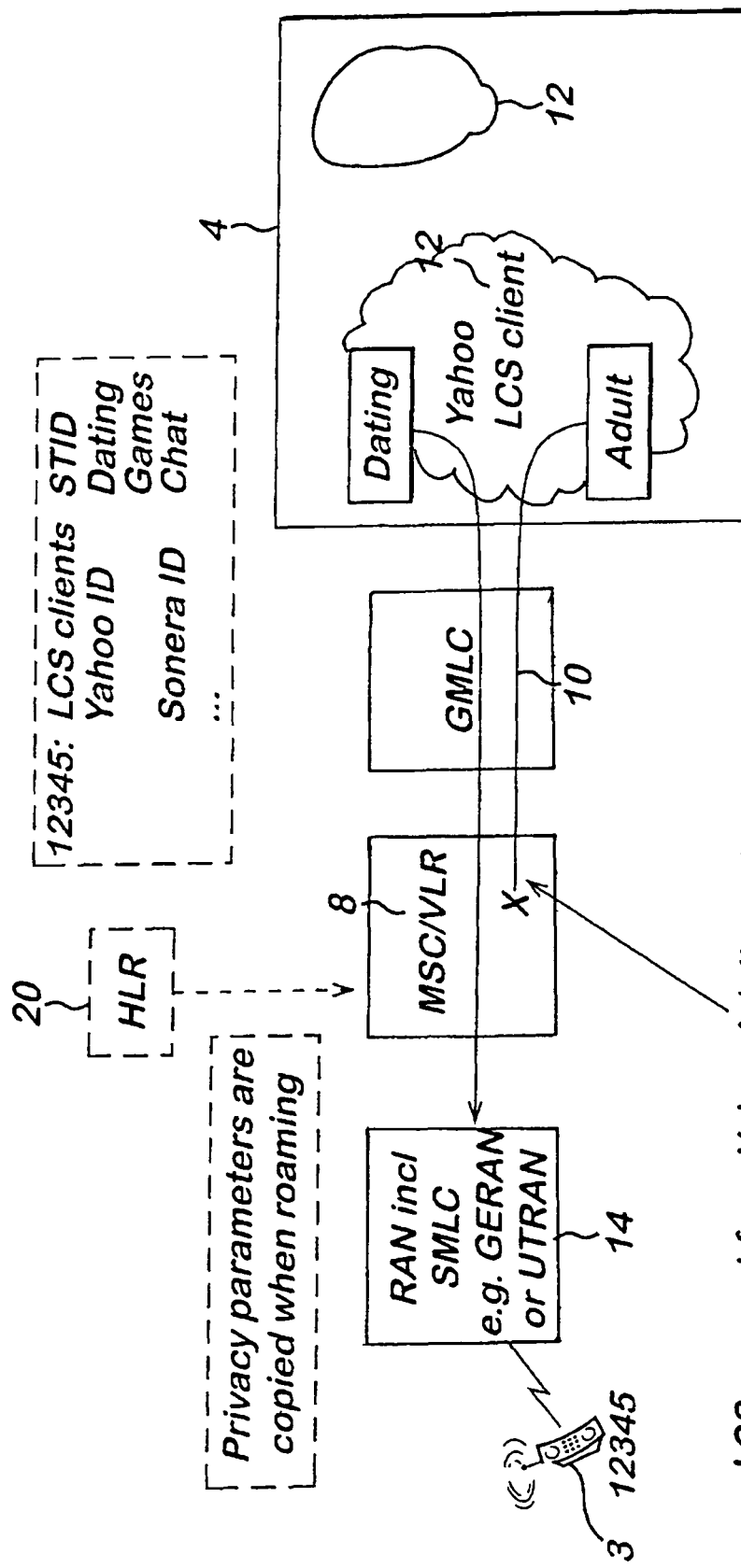
FIG. 2 shows an embodiment of the invention.

Reference is made to FIG. 2 which shows in more detail the location elements of a communications system. The base stations and radio network controllers define a radio access network 14. Different networks have equivalent elements.

The location service (LCS) functionality of the communication system is provided by a Gateway Mobile Location Center (GMLC) entity 10. The GMLC location service node 10 is for gathering and storing data that is required for the provision of the location information. The location service node 10 is arranged to receive via appropriate interface means information concerning the location of the mobile user equipment from the cellular system.

The cellular system may be provided with various different means for processing information gathered from the cells and/or some other parameters and/or for computing by processor means appropriate calculations for determining and outputting the geographical location of the target user equipment. The location information may be obtained by using one or more of the appropriate location techniques. At least a part of the location information may be provided based on information provided by system that is separate from the communication system, such as by means of the Global Positioning System (GPS) or similar. Since there are various possibilities how to implement the location services in the cellular system and since the invention is not dependent on the used location determination technology, these are not be described in any greater detail herein.

In order to be able to separate the user equipment from each other, the location service entity 10 is capable of processing at least one form of identifiers. The identity information may be provided e.g. by means of a mobile subscriber ISDN number (MSISDN), an international mobile subscriber identifier (IMSI) or a temporary identifier (such as a temporary international mobile subscriber identifier: TIMSI) of the mobile user equipment, passwords, or any other form of identifier that can be reliably used for identifying a user equipment and/or a user.

The GMLC server 10 is arranged to receive location information from the radio access network 14 via appropriate controller entities such as the MSC 8 and/or SGSN connected by the appropriate interface means to the access network.

The GMLC 10 may provide the location information in a predefined manner to a location services (LCS) client 12. A LCS Client 12 can be any entity that makes use of the location information. The LCS client 12 can be seen as a logical functional entity that may make a request to the location service entity 10 for the location information of one or more target user equipment. The LCS client 12 may be an entity that is external to the communication network 1, the client entity 12 being provided in an ASP domain 4. Examples of an ASP are Yahoo and Aktivist. The LCS client may also be an internal client (ILCS) i.e. reside in any entity or node (including the mobile station) within the communication system 1.

The LCS clients are entitled to receive at least some degree of information concerning the location (or location history) of a target user equipment. The particular requirements and characteristics of a LCS Client are typically known to the location service server of the communication system by its LCS client subscription profile. This is discussed in more detail hereinafter.

The GMLC 10 may consist of components and bearers needed to serve the LCS client 12. The GMLC 10 may provide a platform which will enable the support of location based services in parallel with other telecommunication services such as speech, data, messaging, other teleservices, user applications and supplementary services. The GMLC 10 may thus provide the client 12, on request or periodically, the current or most recent geographic location (if available) of the target user equipment or, if the location fails, an error indication and optionally the reason for the failure. A more detailed description of a LCS entity that may be employed in the embodiments of can be found e.g. from the above referenced 3GPP technical specification No. 3GPP TS23.271.

A home location register 20 is provided. The home location register is arranged to store information for each user of the network as to whether or not location information relating to that user can be given to a client. If so, the clients from which the user can receive information are listed. Additionally, each LCS client 12 from which the mobile station 3 can receive information can optionally have a service type identity. This service type identity specifies the type of service which the user 3 has subscribed or is happy to receive information. In this context STID identifies the individual service which is allowed to locate the subscriber. There may be no need for subscription or usage of that service (the subscriber is not necessarily using the service which wants to locate him e.g. find your friend) The service type identifier can for example identify dating services, games, chat room services, adult services, entertainment services, travel services or any other services. It should be appreciated that these services listed are by way of example. The number of service types which may be provided can be as little as two or very much larger. The actual categories of services can be any suitable form.

When an LCS request is received from an LCS client, that request includes information identifying the client and the particular service type. In practice, the STID may be optional. For a given user, a check is made in the MSC/VLR to see whether or not the user 3 is to receive that information. The service provider and/or service type information are s in the HLR and are transferred to the MSC/VLR. If the check is positive, the location request is processed. If the service is one to which the user does not subscribe or does not want, then the request is terminated.

It should be appreciated that when the user 3 roams to a different network, the so-called "visited network", the information associated with that user is copied from the home location register 20 to the visitor location register of the visited network. The check as to whether or not the user can receive the information is made in a MSC of the visited network using the information temporarily stored in the VLR.

Thus, the information identifying the LCS client is used to screen requests from the client based on the identity of the client. Thus, the user can control which LCS clients can make location requests relating to the user.

In the described embodiment of the invention, the home location register lists those LCS clients from which location requests can be processed. In alternative embodiments of the invention, the home location register can list those LCS clients from which no location requests can be processed. In other words, if a request is received from an LCS client which is not included in the HLR, then that request is not processed.

The service type identifier indicates for a given service provider the types of service in respect of which a location service can be received. In this way, the user can avoid getting location requests in respect of services which are inappropriate or unwanted. As with the LCS client information, the service type identity may indicate those types of service, for a given LCS client which are not required and in respect of which any location request should be terminated. In preferred embodiments of the invention at least some of the service type identifiers can be globally standardised.

With the current proposals, there is a MAP provide subscriber location message which includes the LCS client identifier. This can be modified in preferred embodiments of the present invention to also include the service type identity. The GMLC uses the client identity to screen the unwanted service providers to thereby block location requests from service providers which are not validated by the GMLC operator. Typically, a commercial agreement will need to be in place between the GMLC operator and the service provider. The mobile services switching centre uses the client identity to protect the subscriber from non-validated services. In practice, when receiving the message including the identity, the MSC maps it to the subscriber's privacy parameters stored in the HLR to screen out unwanted location calculations. Furthermore, the GMLC can use the service type identifier to specify more precise application/LCS client screening to thereby screen out not only particular service providers but also individual service types. In the MSC, more detailed subscriber privacy checks are possible. In particular, the subscriber can specify that location information is available to certain types of services provided by a service provider but not other types.

It should be appreciated that the GMLC or other suitable entity can instead or additionally make the checks carried out by the MSC. In this case, the service identity can be used to transport the result (eg passed, send notification etc) to the MSC. This enables more advanced profiles to be used based on the time of day, the user's rough location or the like. For example, the GMLC makes a check. if the check passes, then the service type identifier is set to a given value. The MSC can look at the value of the service type identifier and if it has the given value, then the location service can be provided or the service indicated provided. Thus in some embodiments of the present inventions the service type identifier can be used to transfer the results of checks made by the GMLC or the like.

In alternative embodiments of the present invention, the service type only is specified. In other words, for a specified service type, any request relating to that service type will be processed, regardless of the identity of the LCS client. In other words, information identifying the LCS client in the HLR can be omitted.

Embodiments of the present invention may be applied additionally or alternatively to presence profiles. The presence service provides access to presence information to be made available to other users or services. Presence information is a set of attributes characterising current properties of presentities (or user) such as status, an optional communication address and other optional attributes etc. For example presence information could be the following status: "meeting", location: "Espoo", voice mail "activated" etc.

The term "watcher" in presence means in simple terms an application or user requesting presence information. "Presentity" is the one that has the presence information to be given to a watcher. ("Principal" is the kind of a owner of information.)

The principal that controls the presentity shall be able to define access rules, in order to control how the presentity's presence information is made available for watchers. These access rules shall define
 a list of watchers allowed access to the presentity's presence information. This list of watchers allowed access to the presentity's presence information. This list can be defined in several ways. For example watchers x and y are allowed, or every watcher is allowed except watcher z.
 the validity of the access authorisation granted for a given watcher. The access to the presentity's presence information can be restricted for a certain period, or during specific periods of the day.
 the attributes of the presentity's presence information that can be made available to a given watcher.
 the ability to provide different presence information based on the watcher and principal's preferences (e.g. its availability). For example: watcher x receives 'Online/Instant Messaging/im:a@there.com', while watcher y receives 'Offline/Instant Messaging/im:a@there.com'.

A set of default access rules shall be defined by the principal,

The Home Environment shall be able to override the privacy requirements if needed.

Embodiments of the inventions can be used to define types of information or service to be provided. Embodiments of the invention can be used to control other aspects of the presence service.

Embodiments of the present invention may be applied additionally or alternatively to user profiles. The User Profile logically is a set of information relevant for a given user. In embodiments of the invention only certain applications are entitled to access the user's service profile.

An application shall be enabled to access User Profile data as long as permission is granted by the User Profile Access Manager. The User Profile Access Manager shall be able to:
 verify authorised access to the requested parts of the User Profile for a given application and User,
 identify the type of access which is requested,
 elaborate the access rights for the request,
 permit dedicated access,
 verify the granted access, and
 deny access requests.

An application has to pass the framework functions prior to initiating the authorisation mechanism of the User Profile Access Manager.

The type of access is one out of:
 reading user profile information; in case parts of the User profile is subject for reading it shall unambiguously be identified by the application,
 adding information to the user profile,
 modify existing information in the user profile.

The control of access rights are ion principle on the user's discretion. The user shall have the possibility to allow or restrict the retrieval and presentation of the user related data.

Embodiments of the invention are arranged to define types of service or information to be provided. Embodiments of the invention can be used to control other aspects of the presence service.

It should be appreciated that embodiments of the present invention have been described in the context of location requests. However, in alternative embodiments of the present invention, the service provider identity and/or the service type identity can be used to screen the information which is sent to a mobile station without there being any location requests.

In alternative embodiments of the present invention, the user is able to define sets of service type identifiers which may be associated with one or more location service clients.

In alternative embodiments of the present invention, the user is able to define sets of service type identifiers which may be associated with one or more information providers.

In alternative embodiments of the present invention, the services may be divided into sets of services. In those circumstances, the service type identifier would identify a given set. It should be appreciated that in embodiments of the present invention, the various functions associated with the various described entities may be provided in different entities or may be distributed.

It should be appreciated that whilst embodiments of the present invention have been described in relation to user equipment such as mobile stations, embodiments of the present invention are applicable to any other suitable type of user equipment.

The embodiment of the present invention has been described in the context of a third generation communication system. This invention is also applicable to any other communication system.

It is also noted herein that while the above describes exemplifying embodiments of the invention, there are several variations and modifications which may be made to the disclosed solution without departing from the scope of the present invention as defined in the appended claims.

The invention claimed is:
1. A method, comprising:
 receiving at an apparatus of a wireless communications service provider a location request message including a type of service associated with an information provider that operates independently from the wireless communications service provider;

determining the type of service from the location request message;

determining whether the location request message is to be processed by using identifying information, wherein the identifying information comprises a service type identifier defining at least one type of service that is different from a wireless communications service that is authorized to be provided to a user; and determining to provide location information, relating to the user, to the information provider based on the identifying information.

2. The method as claimed in claim 1, wherein said service type identity identifies at least one type of service which can be provided to said user.

3. The method as claimed in claim 1, wherein said service type identity identifies at least one type of service which shall not be provided to said user.

4. The method as claimed in claim 1, comprising receiving said identifying information defined by the user.

5. The method as claimed in claim 1, comprising determining to store said identifying information in a data store.

6. The method as claimed in claim 5, wherein said data store is a home location register.

7. The method as claimed in claim 1, wherein said network comprises a wireless network.

8. The method as claimed in claim 7, wherein said network is a universal mobile telecommunications system network.

9. The method as claimed in claim 1, wherein said network comprises a cellular communications network.

10. The method as claimed in claim 1, wherein said identifying information further identifies at least one information provider from which a user is able to receive at least one service.

11. The method as claimed in claim 1, wherein at least some of said information is location dependent.

12. The method as claimed in claim 1, wherein the location request message comprises a request for location information relating to said user.

13. The method as claimed in claim 12, wherein said location request message identifies the type of service which the information provider proposes to provide in response to location information relating to said user.

14. The method as claimed in claim 1, wherein said at least one information provider is a web service provider.

15. The method as claimed in claim 1, wherein said service is at least one of a location service, a presence service and a user profile service.

16. The method as claimed in claim 1, wherein said user is a mobile station.

17. The method as claimed in claim 1, wherein the at least one type of service includes dating service, game, adult service, travel service, or a combination thereof.

18. The method as claimed in claim 1, further comprising determining to provide the location information to the information provider if the user authorizes the location information to be provided for the type of service.

19. The method as claimed in claim 1, wherein the location information includes a presence profile of the user to be provided to the information provider.

20. The method as claimed in claim 1, wherein the determined type of service controls whether to provide data of the user defined by privacy parameters to the information provider.

21. The method as claimed in claim 1, wherein the determined type of service controls user profile access rights of the information provider.

22. The method as claimed in claim 21, wherein the user profile access rights include reading, adding, modification of the user profile, or a combination thereof.

23. A method, comprising:
receiving at an apparatus of a wireless communications service provider a location request message including an identity of an information provider that operates independently from the wireless communications service provider;

determining the identity of the information provider from the location request message;

determining whether the location request message is to be processed by using identifying information of at least one information provider permitted to provide at least one service to a user, wherein at least one service is different a wireless communications service, and which is authorized to be provided to said user; and determining to provide location information, relating to the user, to the information provider based on the identifying information.

24. A method, comprising:
receiving at an apparatus of a wireless communications service provider from an information provider a location request message for location information relating to a user, the information provider that operates independently from the wireless communications service provider, wherein said location request message identifies a type of service associated with the information provider;

determining the type of service;

determining whether the location request message is to be processed by using identifying information comprising a service type identifier defining at least one type of service that is different from a wireless communications service, and that is authorized to be provided to said user; and determining to provide location information, relating to the user, to the information provider based on the identifying information.

25. A system, comprising:
at least one information provider; and
an apparatus of a wireless communications service provider, the information provider operates independently from the wireless communications service provider, the apparatus comprising:
a storage configured to store identifying information comprising a service type identifier defining at least one type of service which is different from a wireless communications service, and which is authorized by the user to be provided to a user, said identifying information comprising a service type identifier;

a determiner configured to determine the type of service associated with an information provider; and a controller configured to use said identifying information and the determined type of service if said proposed information can be provided to said user and if location information relating to the user can be provided to the information provider, wherein the controller determines whether or not the location request message is to be processed, wherein the determiner is further configured to determine to provide location information, relating to the user, to the information provider based on the identifying information.

26. An apparatus, comprising:
at least one processor; and
at least one memory including computer program code for one or more programs, the at least one memory and the computer program code configured to, with the at least one processor, cause the apparatus to perform at least the following, receive identifying information comprising a service type identifier for a user defining at least one type of service that is different from a wireless communications service, and that is authorized to be provided to the user from an information provider, receive a location request message including a type of service associated with the information provider;

determine the type of service;

determine to use said service type identity and the determined type of service to control if said proposed service is different from a wireless communications service, and is authorized to be provided to said user, wherein the controller determines whether the location request message is to be processed, and determine to provide location information, relating to the user, to the information provider based on the identifying information, wherein the apparatus belongs to a wireless communications service provider.

27. The apparatus as claimed in claim 26, wherein at least one of said determiner and said controller is provided in a gateway mobile location center and/or a mobile switching centre.

28. An apparatus, comprising:

at least one processor; and at least one memory including computer program code, the at least one memory and the computer program code configured to, with the at least one processor, cause the apparatus to perform at least the following, receive identifying information for a user defining at least one information provider permitted to provide at least one service to said user, receive a location request message including an identity of an information provider;

determine the identity of the information provider from the location request message;

determine to use said identifying information and the determined identity of said information provider if information which said information provider proposes to provide is different from a wireless communications service, and is authorized to be provided to said user, wherein the controller determines whether a location request message is to be processed, and determine to provide location information, relating to the user, to the information provider based on the identifying information, wherein the apparatus belongs to a wireless communications service provider.

29. An apparatus, comprising:

a first receiver configured to receive identifying information comprising a service type identifier for a user defining at least one type of service which is different from a wireless communications service, and which is authorized to be provided to the user from an information provider;

a second receiver configured to receive from the information provider a location request message for location information relating to said user, wherein said location request message identifies the type of service associated with the information provider;

a determiner configured to determine from the location request message the type of service; and a controller configured to use said service type identifier and the determined type of service, wherein the controller determines whether the location request message is to be processed, wherein the determiner is further configured to determine to provide location information, relating to the user, to the information provider based on the identifying information, and wherein the apparatus belongs to a wireless communications service provider.

30. An apparatus, comprising:

at least one processor; and at least one memory including computer program code, the at least one memory and the computer program code configured to, with the at least one processor, cause the apparatus to perform at least the following, determine to identify information comprising a service type identifier for a user defining at least one type of service which is different from a wireless communications service, and which is authorized to be provided to the user from an information provider, and a location request message including a type of service which an information provider;

determine the type of service;

determine to use said service type identifier and the determined type of service, wherein said controlling means determines whether the location request message is to be processed, and determine to provide location information, relating to the user, to the information provider based on the information identified, wherein the apparatus belongs to a wireless communications service provider.

31. A non-transitory computer-readable storage medium carrying one or more sequences of one or more instructions which, when executed by one or more processors, cause an apparatus of a wireless communications service provider to at least perform the following steps:

receiving a location request message including a type of service which an information provider proposes to provide a user, the information provider operates independently from the wireless communications service provider;

determining the type of service from the location request message;

determining whether a location request message is to be processed by using identifying information, wherein the identifying information comprises a service type identifier defining at least one type of service that is different from a wireless communications service, and that is authorized to be provided to said user; and determining to provide location information, relating to the user, to the information provider based on the identifying information.

32. A non-transitory computer-readable storage medium carrying one or more sequences of one or more instructions which, when executed by one or more processors, cause an apparatus of a wireless communications service provider to at least perform the following steps:

receiving a location request message including an identity of an information provider, the information provider operates independently from the wireless communications service provider;

determining the identity of an information provider from the location request message;

determining whether the location request message is to be processed by using identifying information of at least one information provider that proposes to provide at least one service to a user, wherein the at least one service of said information provider proposes to provide to said user can be provided to the user and controls if location information relating to the user can be provided to the information provider; and determining to provide location information, relating to the user, to the information provider based on the identifying information.

33. A non-transitory computer-readable storage medium carrying one or more sequences of one or more instructions which, when executed by one or more processors, cause an apparatus of a wireless communications service provider to at least perform the following steps:

receiving from an information provider a location request message for location information relating to a user, the information provider operates independently from the wireless communications service provider, wherein said location request message identifies the type of service associated with the information provider;

determining the type of service;

determining whether the location request message is to be processed by using identifying information, wherein the identifying information comprises a service type identifier defining at least one type of service that is different from a wireless communications service, and that is authorized to be provided to said user; and determining to provide location information, relating to the user, to the information provider based on the identifying information.

34. A server of a wireless communications service provider, comprising:

a receiver configured to receive a location request message from a location service client for information about a location of a user equipment, the location service client operates independently from the wireless communications service provider;

a determiner configured to determine, based on the location request message, if a type of service is different from a wireless communications service and is authorized by a user of the user equipment to be provided to the user and to determine if a user profile of said user permits information about the location of said user equipment to be provided to the location service client for said type of service; and a locator configured to provide location information to said location service client based on the user profile.

35. A method, comprising:

receiving a location request message at a server of a wireless communications service provider from a location service client for information about a location of a user equipment, the location service client operates independently from the wireless communications service provider;

determining, based on the location request message, if a type of service, is different from a wireless communications service and is authorized to be provided to a user of the user equipment and determining if a user profile of said user of said user equipment permits information about the location of said user equipment to be provided to the location service client for said type of service; and determining to provide location information to said location service client based on the user profile.

36. A system, comprising:

a location service server of a wireless communications service provider and a location service client that operates independently from the wireless communications service provider, said location service client comprising a requesting unit configured to send a location request message for information about a location of a user equipment and a receiving unit configured to receive location information about the location of said user equipment, and said location service server comprising a receiving unit configured to receive the location request;

a determiner of the wireless communications service provider configured to determine, based on the location request message, if a type of service is different from a wireless communications service, and that is authorized to be provided to the user and to determine if said user profile of a user of said user equipment permits information about the location of said user equipment to be provided to the location service client for said type of service; and a locator for providing said location information to said location service client based on the user profile.

* * * * *